Oct. 23, 1928.
H. C. PARKER
1,688,650
METHOD OF AND MACHINE FOR HANDLING MOLDED CONCRETE BLOCKS
Filed June 30, 1926  4 Sheets-Sheet 1
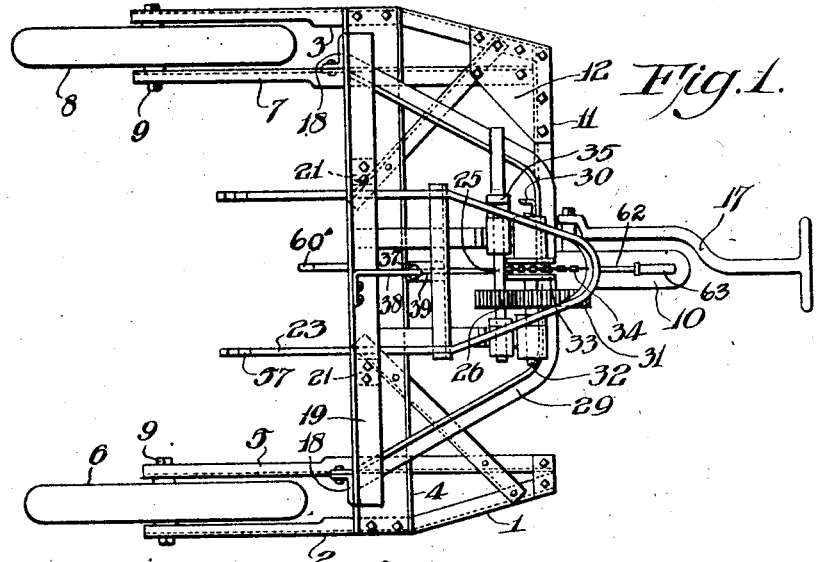
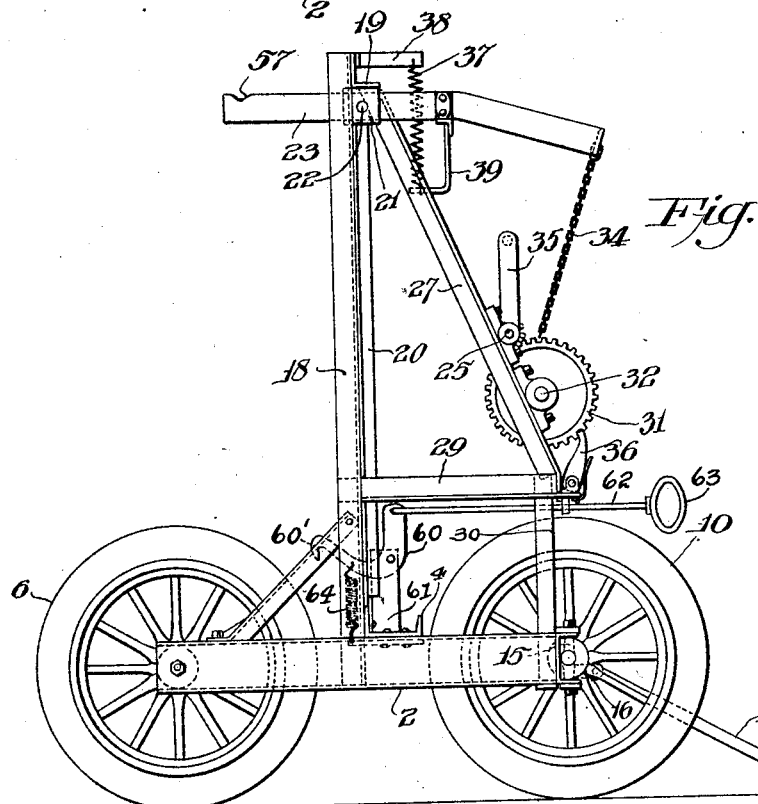
Inventor
Henry C. Parker,
By
Attorneys.

Oct. 23, 1928.  1,688,650
H. C. PARKER
METHOD OF AND MACHINE FOR HANDLING MOLDED CONCRETE BLOCKS
Filed June 30, 1926  4 Sheets-Sheet 2
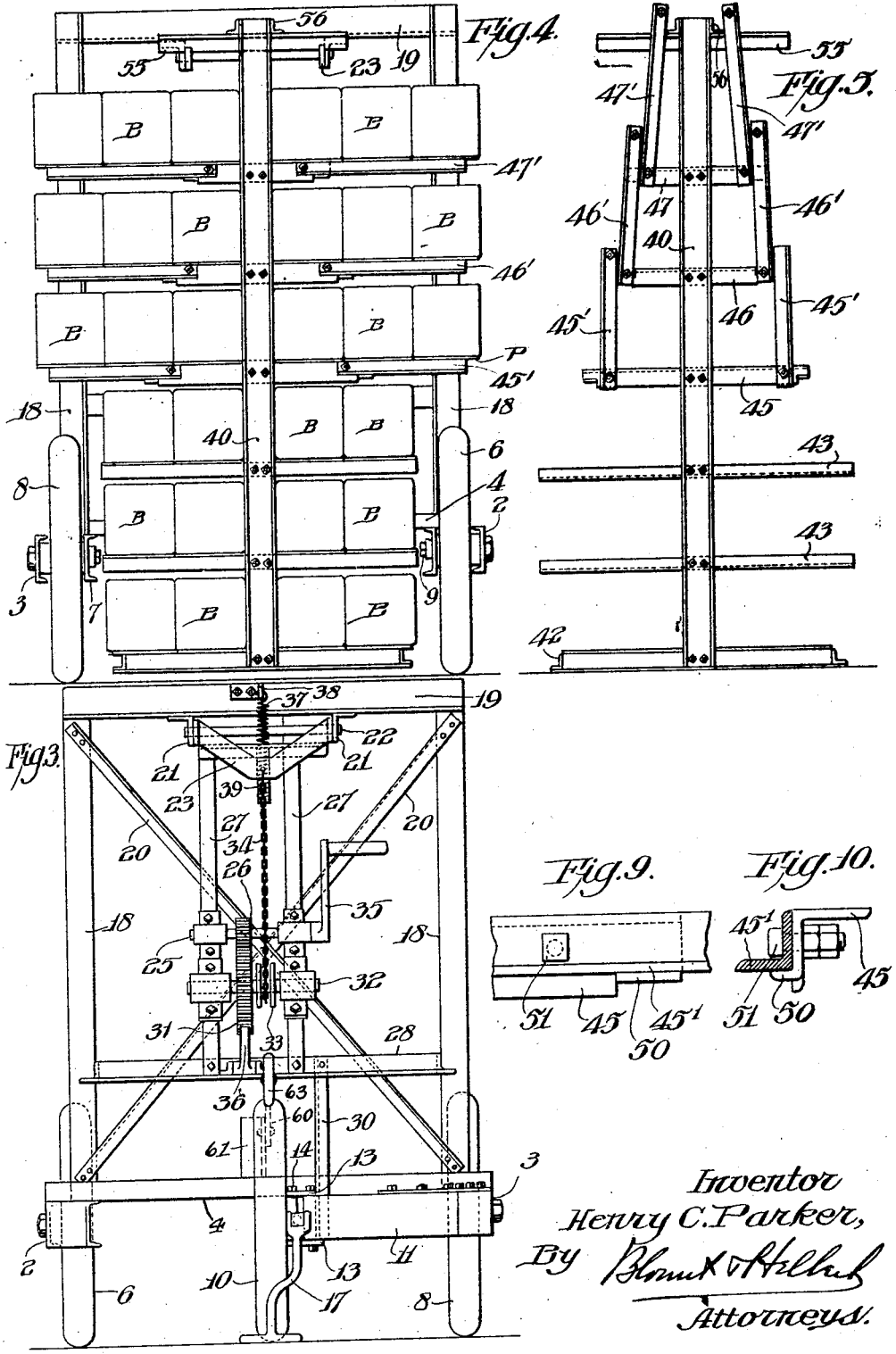
Inventor
Henry C. Parker,
By
Attorneys.

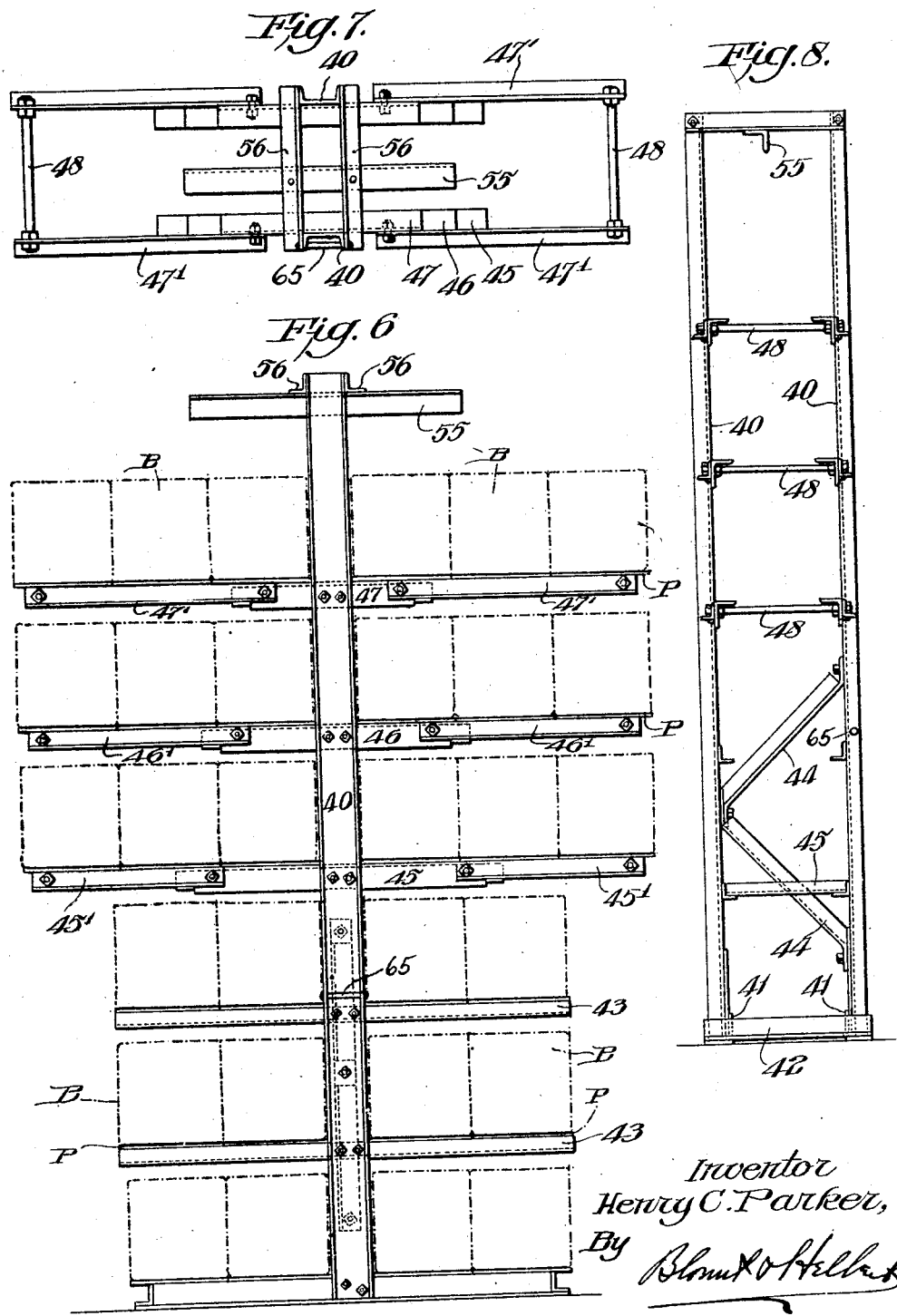

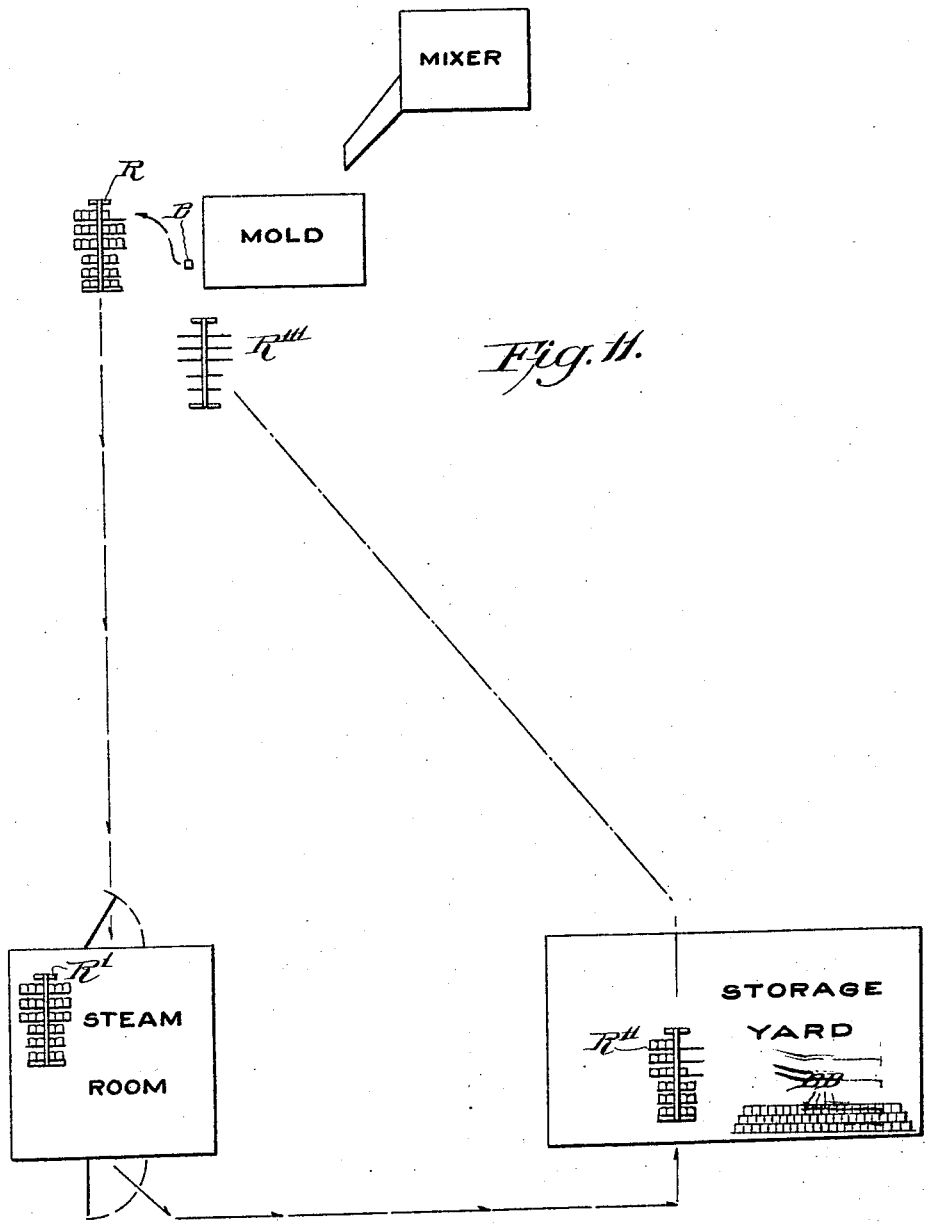

Patented Oct. 23, 1928.

1,688,650

UNITED STATES PATENT OFFICE.

HENRY C. PARKER, OF CATASAUQUA, PENNSYLVANIA, ASSIGNOR TO HOLLYWOOD BUILDING SUPPLY CO., A CORPORATION OF PENNSYLVANIA.

METHOD OF AND MACHINE FOR HANDLING MOLDED-CONCRETE BLOCKS.

Application filed June 30, 1926. Serial No. 119,544.

In recent years the manufacture of concrete blocks molded from mixtures of sand and cement or the like has rapidly increased and many improvements have been made both in the machines used in the industry and in the methods of manufacture and handling with a view to improving the quality of the blocks and lessening their cost, and the present invention is more particularly directed toward the latter end.

It has hitherto been customary to mold the blocks in a portable molding machine placed in the steam curing room where the blocks, after molding, are given an initial cure. The mixed concrete is transported to the machine from the mixer which is located at a convenient position outside of the curing room and fed into the machine either by elevating it mechanically to a hopper disposed thereabove or by shoveling it directly thereinto. As the blocks are molded and stripped from the mold they are carried by hand and piled at a suitable point in the curing room and as the pile grows in size so as to occupy an increasing amount of room, the molding machine is gradually moved back until the room is filled. When removed from the mold and prior to the curing process the blocks are in extremely fragile condition and easily damaged so that the utmost care must be taken in handling and piling the blocks. Upon the completion of the curing process the blocks are individually removed from the metal pallets on which they are molded and then piled on trucks, wooden strips or blocks being interposed between the layers as the piling proceeds so as to keep the blocks apart and prevent them from being chipped or otherwise damaged, and the trucks are then moved to a storage yard the surface of which is ordinarily rough and more or less uneven; the blocks are then removed from the trucks and again piled for storage preparatory to shipment. It is therefore apparent that in accordance with this method of procedure each individual block is handled three times during its passage from the mold to the storage yard necessitating a relatively high labor cost which, of course, enhances the cost of the finished block while the excessive amount of handling likewise enhances the chance of the blocks being damaged or broken. Additionally this risk of injury is further enhanced when the blocks are moved from the curing room to the storage yard whose surface, as hitherto stated, is usually rough and uneven, as the trucks ordinarily employed have wheels of relatively small diameter and either solid or hard rubber tires so that the wheels sink into the depressions in the ground as the trucks are moved and correspondingly jolt the blocks and move them about, particularly when the blocks are piled fairly high on the trucks as is of course desirable in order to include as many blocks in a single load as possible.

My invention contemplates, therefore, an improvement in the method of handling and transporting the blocks which effects a material saving in the labor cost and also very largely eliminates the likelihood of the blocks being damaged in their transit from the mold to the storage yard as well as the provision of a novel form of combined block storage and transportation rack and truck which may be advantageously employed in the carrying out of my said method and by means of which the molded blocks may be expeditiously and advantageously handled and stored after molding and during the preliminary curing operation and thereafter transported to the storage yard.

My invention further includes other objects and advantages to which reference will hereinafter be more specifically made as well as certain novel features of design, construction and arrangement as embodied in my improved combined rack and truck as hereinafter more fully pointed out and described.

To enable those familiar with the art to readily understand and practise the invention I have illustrated in the accompanying drawings a preferred form of the rack and truck and have also diagrammatically illustrated my improved method of handling the blocks. More specifically, in the said drawings Fig. 1 is a top plan view of the truck with the storage rack removed therefrom and Figs. 2 and 3 are respectively side and front elevations thereof. Fig. 4 is a rear view of the truck with the rack in association therewith showing the latter filled with blocks and in position for transportation; Fig. 5 is a rear elevation of the rack shown in Fig. 4 but removed from the truck and without any blocks in position thereof, certain of the arms of the rack being folded up from normal or extended position; Fig. 6 is a rear elevation of the rack loaded with blocks and resting on a supporting surface such as the floor of the curing room; Fig. 7 is a top plan view of the rack shown in Fig. 6 with the blocks removed therefrom, and Fig. 8 is an end view thereof. Figs. 9 and 10 are respectively detail views illustrating the hinge connection between the stationary and movable parts of certain of the rack arms and Fig. 11 is a digrammatic view illustrating my improved method of handling the blocks. The same symbols are used to indicate like parts in the different figures.

Referring now more particularly to the truck proper shown in Figs. 1 to 4 inclusive, the same comprises a horizontally disposed main frame and preferably composed in major part of members of channel or angle section suitably bolted or riveted together to form a rigid, non-yielding structure. More specifically the frame comprises parallel, laterally spaced side members 2 and 3 respectively turned angularly inward at their forward ends and connected near their centers by a transversely extending cross beam 4. Substantially parallel with the rear part of the member 2 is a rearwardly extending member 5 spaced laterally inward therefrom and thus forming a fork in which is disposed the rear wheel 6 while a member 7 corresponding to member 5 is associated with the side member 3 to form a fork for the reception of the other rear wheel 8, said wheels being journaled for rotation on suitable axles 9 carried by the forks. For supporting the front wheel 10 of the three wheeled truck, a transversely extending member 11 may be secured at the forward end of the side member 3 to project inwardly to substantially the center line of the machine, a gusset plate 12 disposed at the junction of members 3 and 11 assisting in enhancing the rigidity of the structure. At the free end of the member 11 may be secured vertically spaced plates 13 whose projecting ends form a yoke for the passage of a pivot pin 14 on which is mounted a steering knuckle 15 which carries a spindle forming the axle about which the wheel 10 rotates. The knuckle may also be supplied with a lug 16 to which is horizontally pivoted the forked inner end of the handle or draw bar 17 by means of which the truck may be pulled about and also steered by turning the front wheel about the pivot pin.

To facilitate the movement of the truck over uneven or unpaved surfaces such as that of the block storage yard I prefer to make the wheels of relatively large diameter and to provide them as shown with pneumatic tires, and I have found that to this end I may conveniently utilize the wheels which are made for the well known Ford automobile and that the knuckle 15 may in such case be one of the ordinary Ford front steering knuckles which is of course adapted for use with said wheels but of course wheels of other types may be employed with equal facility providing, however, they are preferably of relatively large diameter.

This main frame is operative to support a pair of uprights 18 connected at their upper ends by a cross bar 19 and braced by diagonal braces 20 the cross bar being operative to support a pair of laterally spaced depending lugs 21 through which is horizontally extended a pivot rod 22 forming a pivot for a V-shaped lifting fork 23, the closed end of which is directed toward the front of the machine and the free ends toward the rear thereof to terminate a little in advance of the centers of the rear wheels.

The fork is movable vertically about the pivot 22 for a limited distance so that its free ends may be moved from a substantially horizontal position to a somewhat downwardly and rearwardly inclined one to enable the rack hereinafter described to be picked up by the fork when in such inclined position and then lifted slightly so as to clear the rack from the floor by moving the forward end of the fork downwardly and suitable means are provided for effecting this movement. As shown, the said means comprise a winch or windlass having a pinion shaft 25 carrying a pinion 26 and journaled on a pair of laterally spaced supports extended from the cross bar 19 to a transverse bar 28 carried by supporting bars 29 and 30 respectively secured to the uprights 18 and side frame members on each side of the machine. The pinion 26 is in meshing engagement with a gear 31 carried by a shaft 32 also journaled on supports 27 and provided with a drum 33 for the reception of one end of a chain 34 whose other and upper end is connected with the closed end of the fork 23 so that by rotation of the crank handle 35 with which the pinion shaft 25 is provided the chain may be wound around the drum to draw the forward end of the fork downwardly and elevate its rear or free end. Preferably a pawl 36 or other suitable means may be provided and arranged to be engaged with gear 31 so as to lock it against rotation in the opposite direction when desired.

I also prefer to dispose a coil spring 37 between a forwardly projecting bracket 38 mounted on the cross bar 19 and an arm 39 carried by the forward end of the fork in such manner that the spring will be under constant tension and thus tend to raise the forward end of the fork and correspondingly depress the rear or free end so that whenever the chain 34 is slack the free end of the fork will be maintained in a position to engage the rack.

This rack to which reference has just been made comprises a pair of longitudinally spaced uprights 40 preferably of channel shape in horizontal section to the bottoms of which are secured transversely extending angle members 41 whose ends are united by cross bars 42, the uprights being disposed at the center of the angle members so that the latter form in effect a base for supporting the rack. At preferably equidistantly spaced intervals above the base laterally extending arms 43 conveniently formed of angle iron are riveted to the uprights so as to extend symmetrically in opposite directions from each of the latter, the length of these arms 43 being preferably slightly less than the clearance or distance between the rear wheels of the truck so that when the rack is engaged therewith the arms can enter between the wheels. If desired the uprights 40 may be suitably braced by diagonal braces 44 and tied together by one or more cross ties 45.

Above the arms 43 at similar equal vertically spaced intervals stationary cross arms 45, 46, 47 may be secured to each of the uprights, these arms preferably decreasing in length from bottom to top so that the uppermost arm is considerably shorter than the lowermost. To the ends of these arms folding arms 45', 46', 47' are hinged in any convenient way, these folding arms being also preferably of graduated length so that when extended as shown in Fig. 6 their outer ends will all lie in the same vertical plane and will overhang arms 43. Preferably the outer ends of each pair of folding arms may be connected by a tie rod 48 so that both arms of each pair will move in unison and constitute a fairly rigid structure, the arms themselves being preferably formed of angle iron. While any preferred manner of hinging the folding arms to the cross arms may be employed a convenient arrangement for this purpose is shown in Figs. 9 and 10. In this construction the vertical flange of the cross arm, for example cross arm 45, is cut near its outer end and turned up so as to form a short horizontal lip 50 operative to engage the horizontal flange of the folding arm 45' when the latter is rotated about the pivot bolt 51, which removably unites the two arms, until it assumes a horizontal position, thus effecting vertical support for the folding arm and enabling it to sustain the weight of the concrete blocks when disposed thereon as hereinafter described. However, any other form of hinge mechanism may be utilized between the stationary cross arms and folding arms if desired, said mechanism being, however, preferably so arranged as to provide a support for the folding arm when the latter is disposed horizontally. It will thus be apparent that the several folding arms may, when desired, be turned up about their respective pivots so as to dispose them in substantially vertical position as shown in Fig. 5 thereby facilitating the storage of the rack and economizing space and that, conversely, the said arms may be turned downward to horizontal position as shown in Fig. 6, when their outer extremities will preferably considerably overhang the corresponding extremities of the arms 43 so that when the rack is in position on the truck the ends of the folding arms, all of which are considerably above the plane of the truck wheels, will overhang the latter as shown in Fig. 7, thereby materially increasing the capacity of the rack and enabling a considerably greater number of blocks to be disposed thereon than would be the case where the uppermost arms of the rack of the same length as arms 43.

To afford the free ends of the lifting fork of the truck with a suitable point for engaging the rack, the latter is provided at its upper end with a lifting bar 55 disposed midway between the uprights 40 and extending parallel to the arms, said bar being attached to supports 56 secured to the upper ends of the uprights and being of sufficient length to permit the free ends of the fork to engage beneath it, the latter being preferably notched on their upper sides as at 57 so as to prevent the lifting bar from slipping off of the fork during the movement of the latter.

It will of course be understood that the distance between the uprights 40 and the rack is so determined that the different sets of arms will afford adequate support for the blocks when disposed thereon preferably with their longest dimension at right angles to the direction in which the arms extend so that when the rack is stood upon its base and the movable arms unfolded to horizontal position, the blocks B may be readily placed on the rack one at a time, preferably commencing at the bottom and working upwardly, until as shown in Figs. 6 and 7 each of the lower arms 43 has four blocks and each of the upper arms (comprising the central stationary cross arm and the folding arm or extension) has six blocks disposed upon it, the rack, as shown, thus having a total capacity of twenty-four blocks, but, of course, the rack may readily be designed to hold either a larger or smaller number of blocks.

I preferably provide means for steadying the lower end of the rack and prevent it from swinging when the rack is elevated on the truck as hereinafter described, said means in their preferred embodiment comprising a hook 60 pivotally supported on a plate 61 carried by the member 4 of the truck frame, the hook being movable by a rod 62 terminating in a handle 63 disposed at a convenient point adjacent the front wheel 10 of the truck, a spring 64 being arranged so as to constantly tend to pull the hook downwardly about its pivot. The hooked end 60' of the hook is adapted to engage a pin 65 disposed in the channel of the front member 40 of the rack whereby when the latter is elevated on the truck engagement of the hook with the pin will serve to steady the lower end of the rack but by pulling the rod 62 forwardly the hook can be readily disengaged from the pin when it is desired to remove the rack from the truck.

My improved method of handling the molded blocks in accordance with my invention and by means of the truck and rack hitherto described may best be understood by reference to Fig. 11. As shown in said figure the concrete from which the blocks are to be formed may be mixed in any suitable mixer disposed at any convenient point and fed directly to the adjacent molding machine or mold. As a block B is withdrawn from the latter it is placed on a rack R constructed as hitherto described and set in convenient proximity thereto. After the rack has been filled with blocks, each of which is supported on a metallic pallet P (see Fig. 6) on which it is withdrawn from the mold, the truck is moved into proximity to the rack and so manipulated as to bring the lower arms thereof between the rear wheels of the truck and the free ends of the lifting fork 23 beneath the lifting bar 55 of the rack. The winch on the truck is now operated so as to engage the arms of the lifting fork with the bar and lift the rack sufficiently to clear the base from the floor or other supporting surface on which it previously rested and the winch then locked by the pawl 36 or other locking means so as to maintain the rack in such elevated position as shown in Fig. 4. The truck carrying the rack may now be drawn or pushed into the steam room as indicated by the line of arrows in Fig. 11 and after being brought to the desired position therein the rack is lowered by suitable operation of the winch until the rack base rests upon the floor and the truck then removed and employed to transport another rack to the room until the latter is filled. Owing to the peculiar construction of the truck and the position which the loaded rack occupies when associated therewith it is possible to stow the racks very closely together in the curing room and also closely to the walls thereof, while by reason of the fact that the upper arms of the rack are of considerably greater length than those which lie below the level of the wheels, a much larger number of blocks can be stored in a room of given capacity than would otherwise be the case as the trucks may be so maneuvered as to dispose the ends of the upper arms of the different racks very closely together while leaving ample space for the rear truck wheels to pass between the adjacent ends of the lower arms of the racks.

Upon the completion of the curing operation in the steam room the truck is again moved thereinto and the racks, loaded with the cured blocks, consecutively picked up and thence transported to the storage yard as indicated by the line of arrows and there unloaded, either while suspended on the truck or after being lowered to the ground and the blocks piled up for storage as indicated at BB. The unloaded racks are then consecutively transported either by means of the truck or otherwise to a point adjacent the mold and the cycle of operations repeated.

It will thus be observed that in accordance with my improved method of transporting the blocks each block is handled but twice, namely, when it is removed from the mold on its pallet and placed on the adjacent rack and when it is finally removed from the rack in the storage yard, so that all handling of the blocks subsequent to the curing operation and prior to their transportation to the yard as now customarily practised is avoided and the labor cost and danger of breakage correspondingly reduced. Additionally, as the blocks are transported from the molding machine to the curing room or rooms in batches it is unnecessary to utilize a portable molding machine and mold the blocks in each curing room with consequent necessity of transporting the concrete thereto and loading it in the mold as it is moved about; instead a stationary mold may be used and located adjacent the hopper of a stationary concrete mixer, the mold and mixer being disposed at a central point convenient to the various steam rooms to which the blocks are transported on the racks as above described, thereby materially enhancing the speed of production and reducing the cost thereof. Moreover, the peculiar construction of my improved truck and rack by which the latter when being transported is freely suspended from the truck and the employment on the latter of wheels of relatively large diameter and with pneumatic tires enables the blocks to be transported without injury both when they are in extremely fragile condition as they come from the mold before the preliminary curing and also when they are being taken to the storage yard and the truck is being moved about over the rough and uneven surface thereof so that the percentage of blocks damaged during transit is greatly reduced below that resulting from the present practice.

It will of course be readily understood that a plurality of racks will customarily be employed simultaneously during the process of manufacturing the blocks and as indicated in Fig. 11 where one partly loaded rack R is shown as disposed near the mold, another fully loaded rack R' in the curing room, still another rack R'' being unloaded in the storage yard and still another rack R''' disposed adjacent the mold to take the place of rack R when the latter is moved into the steam room.

While I have herein described my improved method of handling molded concrete blocks with considerable particularity and illustrated a preferred form of apparatus suitable for the performance of the said method, it will be understood other apparatus than that to which I have referred may be used in the practice thereof and also that the specific details of design, construction and arrangement of the rack and truck which I have illustrated and described may be varied in minor particulars if desired without departing from the spirit and scope of the invention as defined in the appended claims.

Having thus described my invention, I claim and desire to protect by Letters Patent of the United States:

1. A rack for supporting molded concrete blocks comprising a base, a pair of aligned uprights rising from opposite sides thereof and a plurality of horizontally extending arms secured to each of said uprights in vertically spaced relation and in horizontally aligned relation with the corresponding arms on the other upright, the arms adjacent the upper end of the rack being provided with movable extensions hinged to their outer extremities and means for supporting said extensions vertically when turned to horizontal position.

2. A rack for supporting molded concrete blocks comprising a base, a pair of aligned uprights rising from opposite sides thereof and a plurality of horizontally disposed cross arms secured to each upright in vertically spaced relation and in horizontally aligned relation with the corresponding arms on the other upright, the arms adjacent the upper end of the rack being provided with extensions hinged thereto adjacent their outer extremities and adapted when turned to horizontal position to extend beyond the ends of the arms adjacent the lower end of the rack, and means for affording vertical support to said extensions when turned to horizontal position.

3. A machine for transporting molded concrete blocks comprising, in combination, a block-supporting rack comprising laterally extending vertically spaced arms adapted to receive the molded blocks, said rack being provided adjacent its upper end with a lifting bar, a truck having a horizontally disposed main frame, a single front wheel and a pair of rear wheels laterally separated to receive the rack between them, the arms of the rack adjacent to the bottom thereof being of a length to extend between the rear wheels and the arms of the rack above the wheels being of greater length than the bottom arms to overlie the wheels, a framework rising from the main frame, a lifting member supported adjacent the upper end of the framework and having free ends extending rearwardly above the space between the rear wheels and engageable with the lifting bar at spaced points, said lifting member being movable about a horizontal pivot for lifting the rack vertically without tilting the rack or moving the truck longitudinally during the lifting operation.

4. A rack for supporting molded concrete blocks comprising a base, a pair of spaced uprights rising from the base, and a plurality of horizontally extending arms secured in vertically spaced relation to each of said uprights in horizontally aligned relation to the corresponding arms on the other upright, the arms at the bottom of the rack being shorter than the upper arms to permit them to be arranged between spaced wheels of a truck and the upper arms being longer to overlie the truck wheels.

In witness whereof, I have hereunto set my hand this 26th day of June, 1926.

HENRY C. PARKER.